United States Patent

[11] 3,594,938

| [72] | Inventor | Alfred Mosch |
| | | 442 Popular St., Bridgeport, Conn. 06605 |
| [21] | Appl. No. | 741,970 |
| [22] | Filed | July 2, 1968 |
| [45] | Patented | July 27, 1971 |

[54] WARNING DEVICE
2 Claims, 7 Drawing Figs.

| [52] | U.S. Cl. | 40/129 C |
| [51] | Int. Cl. | G09f 7/00 |
| [50] | Field of Search | 40/128, 129, 125 F, 129 A |

[56] References Cited
UNITED STATES PATENTS

| 2,821,035 | 1/1958 | Joseph | 40/129 A |
| 2,911,746 | 11/1959 | Frey | 40/128 |
| 3,255,725 | 6/1966 | Von Kreidner | 40/129 C X |
| 3,430,374 | 3/1969 | Woodard | 40/129 |

*Primary Examiner*—Robert W. Michell
*Assistant Examiner*—Wenceslao J. Contreras
*Attorney*—Ernest F. Marmarek ABSTRACT: A warning device for vehicles having a rear portion, the device comprised of a rectangular warning sign made of a flexible sheet material having upper and lower edge portions; attachment means are connected to the edge portions for mounting the device to the vehicle. The attachment means are individually removably connected to the rear of said vehicle when the device is being displayed.

PATENTED JUL 27 1971 3,594,938

WARNING DEVICE

DESCRIPTION OF THE INVENTION

The invention relates to an improved safety warning device for automotive and other vehicles which becomes temporarily effective when the vehicle stands on the road in the way of other vehicles.

It has been proposed to permanently attach a warning sign to the rear of an automobile in such a way that it is hidden, for example, in the rear compartment when the automobile is in normal use and that it becomes visible when, for example, the cover of the rear compartment is opened. The conventional structure, particularly the means for mounting the warning sign on the rear part of the automobile are complicated and expensive to make and install.

It is an object of the present invention to provide a safety warning device for automotive and other vehicles for warning other vehicles that an automobile stands on the road in their way, which device can be quickly and reliably connected to the rear of an automobile and can be quickly taken down and folded for storage when no longer needed.

It is a further object of the invention to provide a safety warning means which can be quickly and reliably applied to the rear of an automobile of any type and make, whether it has a rear trunk or motor compartment, whether it is a passenger car, a fastback, a station wagon or a truck, without making any alteration of the device.

The warning device according to the invention comprises a warning sign which is applied, preferably painted, to a flexible, sheetlike, if desired, translucent material of rectangular configuration and having an edge on top of the sign and an edge at the bottom of the sign, said edges being parallel and individually reinforced by a rodlike element. A sturdy elastic strap is connected to the ends of each rodlike element and arranged coextensive therewith. The strap connected to the ends of the rodlike element which is on top of the sign is stretched around the free edge of the cover of the trunk compartment of the car which must be protected by the sign, for holding the rodlike element which is on top of the sign, to the cover of the trunk compartment. The strap which is connected to the ends of the rodlike element which is at the bottom of the sign is stretched around any suitable protuberance at the bottom of the rear of the car, for example the license plate, so that the sign is firmly held to the car.

If the sign is used in connection with a station wagon, the upper strap is stretched around the partly opened rear window or is clamped between the rear window and its frame. The upper strap may be cut in the middle and the halves of the strap may be individually placed parallel with the rear side portions of the station wagon and clamped between the rear side windows and their frames. This system can also be used in passenger cars having no rear compartment and cover therefore and having a stationary rear window.

If the sign is used in connection with trucks there are always some protuberances around which the straps can be laid for keeping the sign in place.

In lieu of elastic straps inelastic ropes, strips and the like may be tied at least to the ends of the rodlike element on top of the warning sign. These inelastic ropes are pulled tight and their ends are connected by a bow knot when the warning device is displayed.

For removing the warning sign the straps, if elastic, are simply pulled off the parts of the car around which they have been stretched. For storage of the sign the two rodlike elements are placed parallel with and adjacent each other and the folded sheetlike material to which the sign is applied is rolled onto the rodlike elements.

The sign now takes very little space and can easily be stored in the vehicle.

If the straps are inelastic the bow connecting the ends of two straps is pulled loose for disconnecting the straps and the warning sign is folded and rolled onto the rodlike elements for storage as described above.

If desired, the upper rodlike element or the upper edge of the sign may be permanently attached to the inside of the free edge portion of the cover of the trunk compartment of the automobile and the lower rodlike element may be disconnectably connected to the inside of the cover when the sign is not used. When the cover is lifted, the lower edge of the sign can be pulled rearward and the strap attached to the rod on the lower edge of the sign can be made fast, for example, on the license plate.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Like parts are designated by like numerals in several FIGS. of the drawing.

Figure 1:
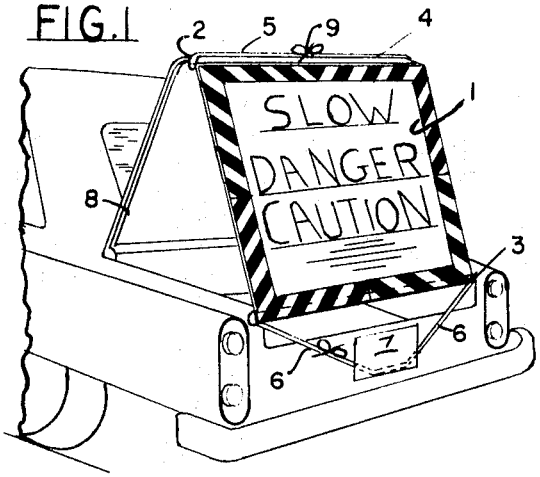
FIG. 1 is a perspective schematic view of the rear portion of an automobile having a rear compartment and a cover therefor, provided with a warning sign according to the invention in operative position.

Referring more particularly to FIG. 1 of the drawing, numeral 1 designates a warning sign painted on or otherwise applied to a sheet of a flexible material which may be transparent. The upper edge of the sheet 1 is reinforced by a rod 2 and the lower edge is reinforced by a rod 3. A string 4 is connected to the right end of the rod 2 and a string 5 is connected to the left end of the rod 2. A string 6 is connected to the ends of the rod 3 and is sufficiently long to be stretched around the license plate 7 or other suitable element of the lower rear portion of the car to be protected. After securing the string 6 to the car the strings 4 and 5 are laid adjacent the outside of the free end portion of a cover 8 of the rear compartment of an automobile, the rod 2 being on the inside of the free end portion of the cover 8. The free ends of the strings, ribbons or ropes 4 and 5 are now pulled toward each other and tied by a bow 9. The sign 1 is thereby pulled up and the string 6 tensioned. If desired, the latter may be cut to form two parts each being connected to an end of the rod 3. These two parts can be pulled together for tightening and connected by a bow.

Figure 2:
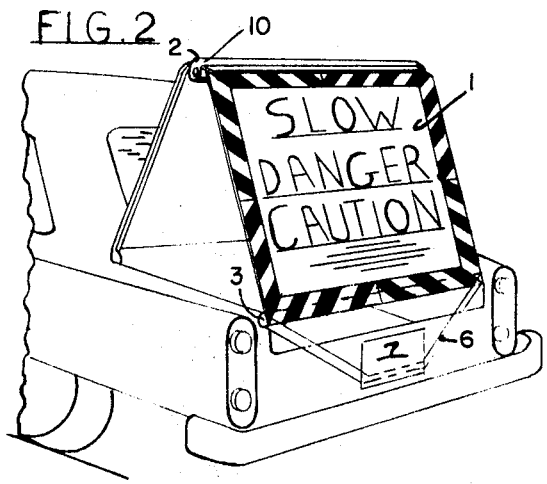
FIG. 2 is a perspective schematic view of the rear portion of an automobile having a rear compartment and a cover therefor, provided with a modified warning sign according to the invention in operative position.
Figure 6:
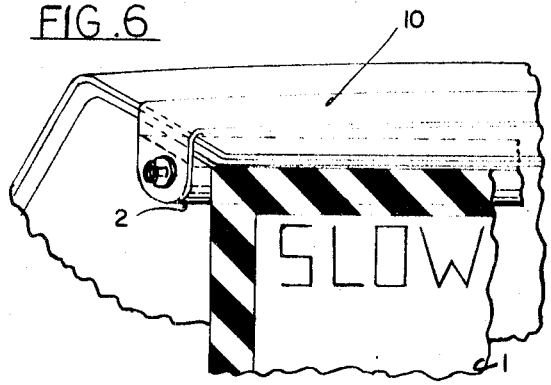
FIG. 6 is a large scale perspective view of the upper left portion of the warning sign according to the invention illustrated in FIG. 2.
Figure 7:
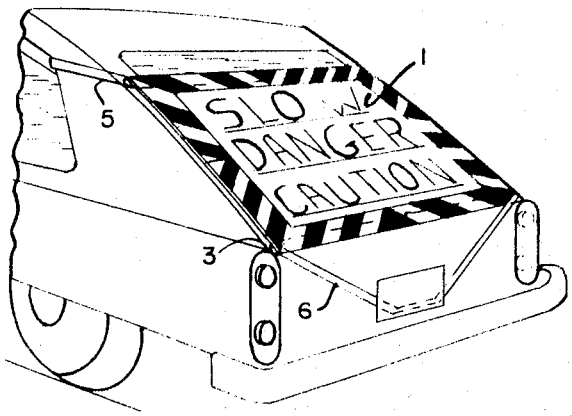
FIG. 7 is a perspective view of the rear portion of a "fastback" automobile with a warning sign according to the invention shown in displayed position.

In the modification shown in FIGS. 2 and 6 the two inelastic elements 4 and 5 shown in FIG. 1 are replaced by an elastic strap 10 and the string 6 shown in FIG. 1 may also be made of elastic material. The arrangement shown in FIGS. 2 and 6 facilitates and quickens display of the warning sign and makes its hold on the automobile more reliable.

Figure 3:
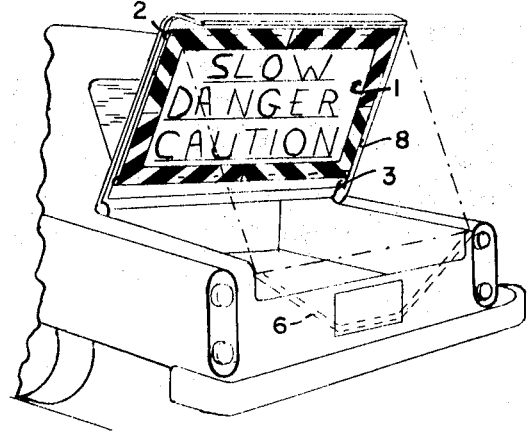
FIG. 3 is a perspective schematic view of the rear portion of an automobile having a rear compartment and cover therefor and provided with another modification of a warning device.

In the embodiment of the invention shown in FIG. 3 the upper rod 2 or edge of the warning sign is made fast on the inside of the cover 8 of the trunk compartment. The lower rod 3 or edge of the warning sign is removably connected to the inside of the cover of the trunk compartment, for example, by permanent magnets, snap fasteners or the like, not shown, when the warning sign is not in use. When display of the warning sign is desired, the cover 8 is opened and the rod 3 or lower edge of the sign is disconnected from the cover. A string 6, which may be elastic, and which is connected to the ends of the lower rod 3 is stretched around a projecting part, for example the license plate, of the lower rear portion of the automobile, as shown by dotted lines. If the string 6 is inelastic and in two parts the ends thereof are pulled together and connected by a bow.

Figure 4:
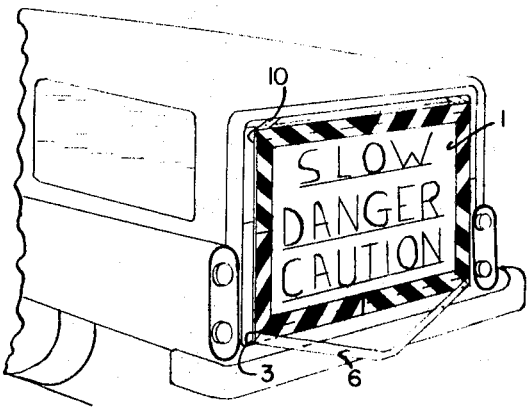
FIG. 4 is a perspective schematic view of the rear portion of a station wagon provided with a warning sign according to the invention in displayed position.

FIG. 4 shows the application of the warning sign 1 to the rear of a station wagon. Here the upper strap 10 or straps 4 and 5 are clamped between the slightly opened rear window and its frame. The lower strap 6 is arranged in the same manner as shown in FIGS. 1 to 3.

If there are no facilities for connecting the upper edge of the warning signal 1 to the rear of the automobile, as in the case of an automobile body know as "fastback," the strap connected to the upper edge of the sign may be made in two parts, each part having an end made fast on an upper corner of the sign, the free ends of the straps being individually clamped between the slightly opened rear side windows and their frames. In the embodiment shown in FIG. half-round the upper rod may be omitted.

Figure 5:
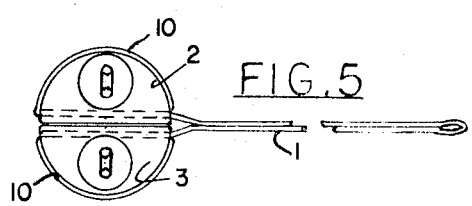
FIG. 5 is an end view of a warning device according to the invention in folded position.

FIG. 5 shows a sign according to the invention in folded condition. The upper rod 2 and the lower rod 3 have a half-round cross-sectional configuration. Opposite edge portions of the sign 1 are individually made fast on the flat surfaces of the rods. The ends of the strap 10 or straps 4 and 5 are connected to the ends of the rods preferably by means of ringscrews. When the sign is in rest position the strap 10 or straps 4 and 5 are alongside of and adjacent the half-round longitudinal surfaces of the rods. For storing the device the flat surfaces of the rods are placed together and the sign is folded as shown in FIG. 5. The extension of the folded sign is only half of that of the extended sign and the sign can be quickly rolled up on the cylindrical member formed by the two rods.

I claim

1. A warning device for automotive and other vehicles, said warning device comprising a substantially rectangular warning sign made of flexible sheet material and having an upper edge portion and a lower edge portion, first string means connected to said upper edge portion, and second storing means connected to said lower edge portion, said string means being individually removably attached to a portion of a vehicle when the warning sign is in displayed position, rodlike reinforcements for said upper edge portion and for said lower edge portion, said string means being individually connected to the ends of said rodlike reinforcements, each of said rodlike reinforcements has a half-round cross section and a plane longitudinal surface, said edge portions being individually connected to said plane surfaces, said plane surfaces being adjacent and opposite one another for forming a cylindrical means for rolling the warning sign thereonto when the warning sign is prepared for storage.

2. A warning device for automotive and other vehicles, said warning device comprising a substantially rectangular warning sign made of a flexible sheet material and having an upper edge portion and a lower edge portion, first string means connected to said upper edge portion, and second string means connected to said lower edge portion, said string means being individually removably attached to a portion of a vehicle when the warning sign is in displayed position, rodlike reinforcements for said upper edge portion and for said lower edge portion, said string means being individually connected to the ends of said rodlike reinforcements, each of said rodlike reinforcements having a half-round longitudinal surface, said string means being alongside and adjacent said half-round longitudinal surface when the warning device is in storage position.

UNITED STATES PATENT OFFICE
CERTIFICATE OF CORRECTION

Patent No. 3,594,938          Dated July 27, 1971

Inventor(s) Alfred Mosch

It is certified that error appears in the above-identified patent and that said Letters Patent are hereby corrected as shown below:

Column 4, line 5, "storing means" should read -- string means --.

Signed and sealed this 25th day of July 1972.

(SEAL)
Attest:

EDWARD M. FLETCHER, JR.          ROBERT GOTTSCHALK
Attesting Officer                Commissioner of Patents